INVENTOR
STEN DANIEL VIGREN

BY Stauch, Nolan & Neale
ATTORNEYS

Nov. 29, 1960 S. D. VIGREN 2,962,554

CURRENT-FEED ARRANGEMENT IN AUTOMATIC TELEPHONE AND TELEGRAPH SYSTEMS

Filed Sept. 13, 1956 4 Sheets-Sheet 2

INVENTOR
STEN DANIEL VIGREN

BY [signature]

ATTORNEYS

Nov. 29, 1960

S. D. VIGREN 2,962,554

CURRENT-FEED ARRANGEMENT IN AUTOMATIC TELEPHONE AND TELEGRAPH SYSTEMS

Filed Sept. 13, 1956

4 Sheets-Sheet 3

INVENTOR

Sten Daniel Vigren

BY Strauch, Nolan & Neale

ATTORNEYS

INVENTOR
Sten Daniel Vigren

BY Stauch, Nolan & Neale

ATTORNEYS

United States Patent Office 2,962,554

Patented Nov. 29, 1960

2,962,554

CURRENT-FEED ARRANGEMENT IN AUTOMATIC TELEPHONE AND TELEGRAPH SYSTEMS

Sten Daniel Vigren, 16–18 Mose-Backetorg, Stockholm S., Sweden

Filed Sept. 13, 1956, Ser. No. 610,869

Claims priority, application Sweden Sept. 17, 1955

5 Claims. (Cl. 179—16)

The present invention relates to telephone and telegraph systems and in particular to automatic systems of the kind comprising an automatic exchange having link circuits and subscribers' lines connectable to the link circuits, and current feed devices for feeding direct current to the subscribers' lines over the link circuits. More particularly the invention relates to a current feed device in telephone systems of the central battery type including systems having a central current feed from a rectifier connected to an alternating current source.

In telephone systems the resistance of the different subscribers' lines often varies to a considerable extent and therefore the microphones of different subscribers' sets will have a highly varying efficiency. In automatic telephone systems in which switching signals in the form of impulse trains, usually consisting of break impulses, are transmitted over long subscribers' lines having a comparatively high line resistance, the reception of the impulses is difficult and frequently results in improper dialing.

It is the object of the invention to eliminate these disadvantages by the provision of suitable control devices for causing the line current to be independent of the resistance of the seized subscribers' line and substantially constant within wide limits. The term "substantially constant" also includes a possible and sometimes preferred embodiment in which the control devices are adapted to cause a certain overcompensation so that the line current increases to some extent in the case of increased line resistance. In such case a microphone belonging to a subscriber's line having a high resistance is fed with a stronger current than a microphone connected to a subscriber's line having less resistance, to thereby compensate for the higher speech attenuation in lines having a high resistance. In order that such an effect shall be obtained it is of course required that the microphones are of the carbon type or some other similar type in which the transmission efficiency is dependent on the supplied line current.

In a preferred embodiment of the invention the control devices or values representing the required control action are utilized to control the gain of repeaters included in the connections. According to the basic principle of this gain control a measure of the resistance of a seized line is obtained by the current control action, and this measure is in turn used as a measure of the required gain control, so that the transmission speech level can always be maintained within predetermined limits.

The invention will be described more in particular in conjunction with the accompanying drawings which illustrate by way of example some embodiments of the invention.

Figure 1:
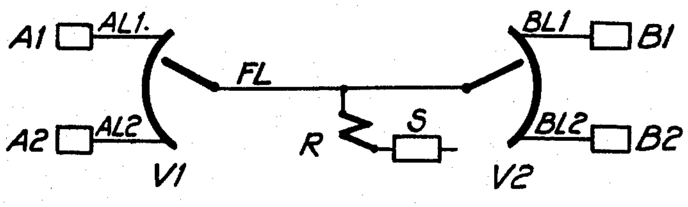
Figure 1 shows very schematically a telephone system having current feed means of conventional design.

In Figure 1 V1 and V2 designate switching means, e.g. selectors such as line finders and final selectors, for connecting calling subscribers A1 and A2 to called subscribers B1 and B2 respectively over a link circuit FL accessible in common to the subscribers. The selectors V1 and V2 are situated in the exchange, and subscribers A1, A2 and B1, B2 respectively are connected to the exchange by subscribers' lines AL1, AL2 and BL1, BL2 respectively. The current feed coil which is normally provided in central battery systems, is designated R. Through this coil microphone feed current is supplied to the subscribers' lines via the link circuit FL from a current source S. The link circuit FL may of course comprise a plurality of internal connecting links as is the case when a plurality of selector stages, e.g. group selector stages, are provided. Often there are two sets of current feed coils R which supply current to the link circuit FL at either side of a capacitor inserted in the connecting link, so that separate current feed means are provided for the calling and the called subscriber. It will be understood that the invention as described in the following can be applied to both these current feed devices. During the time when a register is connected to a link circuit FL for the reception of signals in the form of break impulses, the current feed to the calling subscriber's line usually takes place from a current feed device provided in the register. The invention can also be applied to this current feed device.

Figure 2:
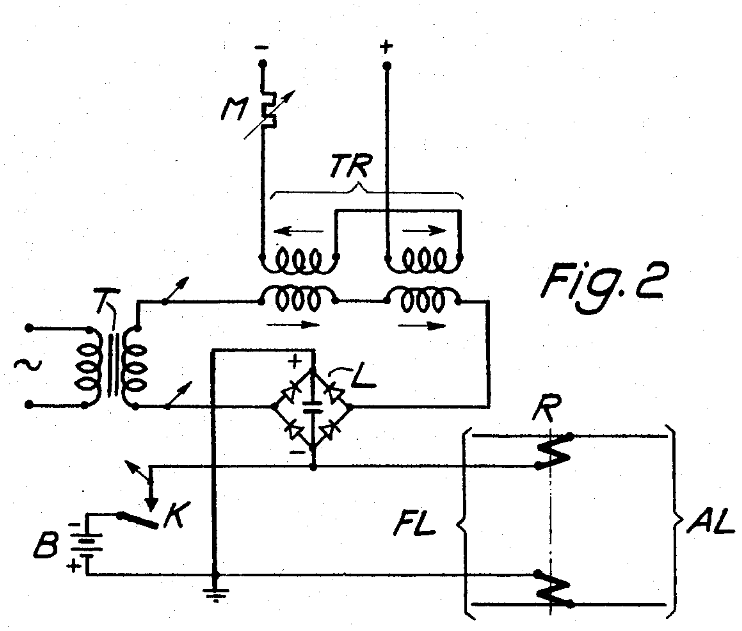
Figure 2 shows schematically a device according to the invention as applied to a telephone system according to Figure 1 in which each link circuit is provided with a current control device consisting of a saturable core reactor (also know as "transductor"). In this embodiment the whole line voltage is obtained from a rectifier connected to an alternating current source, e.g. the power mains.

Figure 2 shows a suitable embodiment of a current feed device for use in a telephone system, e.g. of the kind shown in Figure 1. In Figure 2 the current feed coil is designated R, the subscriber's line AL and the link circuit FL. A direct current source corresponding to the device S in Figure 1 is connected to the current feed coil R. The current source consists of a transformer T which is connected to an alternating current source, and the secondary of which is connected to a rectifier bridge L in series with the alternating current windings of a saturable core reactor TR. The direct current side of rectifier L is connected to the current feed coil R.

A battery B is provided to serve as a spare current source in the case that the alternating current is interrupted. The battery B is normally disconnected from the circuit by means of a contact K of a relay energized from the alternating current source. If the alternating current is interrupted, the contact K is closed and connects the battery B to the circuit.

The saturable core reactor TR may consist of two magnet cores or one three-legged core with four windings, two of which are alternating current windings and two direct current windings. The alternating current windings and the direct current windings are arranged on the cores and interconnected in such manner that the voltages induced in the direct current windings by the alternating current windings are in phase opposition in the direct current circuit. The two direct current windings are connected via a variable resistor M to a direct current source (which may consist of the spare battery B or a separate rectifier connected to the transformer T). Thus a substantially constant direct current is supplied to the direct current windings of the saturable core reactor TR. The magnitude of this current can be adjusted by means of the resistor M. As is well known, a saturable core reactor with a constant direct current magnetization maintains within a relatively large range of the magnetisation characteristic the alternating current flowing through its alternating current windings at a substantially constant value so that the direct current ampere turns and the alternating current ampere turns become substantially equal. In this way the current supplied to the current feed coil R will be substantially constant and, within wide limits, independent of varying resistances of the subscribers' lines AL connected to the device.

In the case that current feed devices are provided in registers during the reception of dial impulses, these devices can also be designed as shown in Figure 2 whereby the impulse reception in a high degree becomes independent of the characteristic of the subscribers' lines so that a satisfactory impulse reception is secured.

Figure 3:
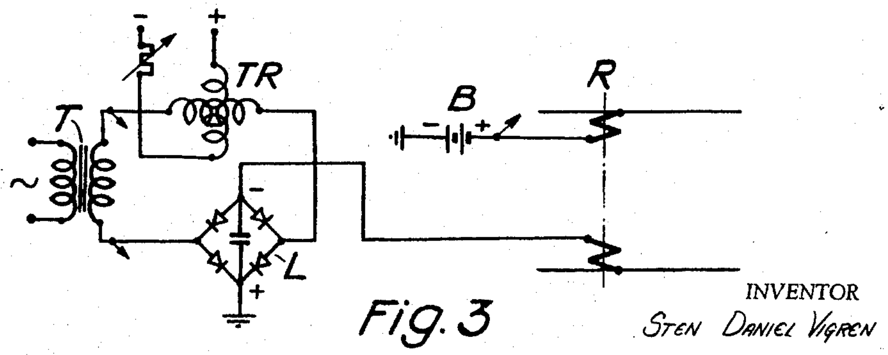
Figure 3 shows a further embodiment of the invention in which a saturable core reactor is used for the current control, but in this embodiment only an additional voltage required for the control is derived from the alternating current source, while the main part of the line voltage is delivered by a central battery in the usual manner.

In the arrangement shown in Figure 3 a saturable core reactor TR working with a substantially constant direct current premagnetization is used as control means to keep the line current constant and make it substantially independent of the resistance of the seized subscribers' lines. However, in this case the rectifier L is connected in series with the ordinary central battery B, so that the current derived from the alternating current source over the transformer T and the rectifier L is added to the current supplied by the battery B. In this arrangement the current feed and control devices individual to the different link circuits can be given smaller dimensions.

Figure 4:
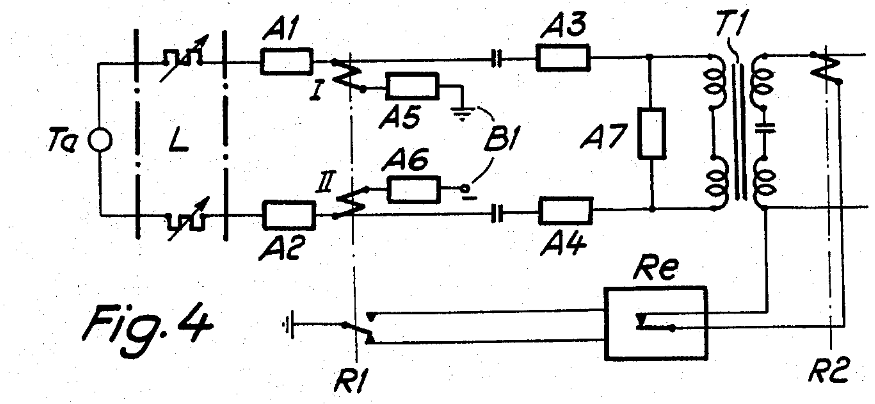
Figure 4 shows very schematically how the current and gain control devices can be connected to lines in the automatic exchange.

Figure 4 shows a subscriber's apparatus T*a*, a line L and a link circuit consisting of a relay repeater R*e* of known type comprising relays R1 and R2. The figure further shows an induction coil T1 designed as a filter for the transmission of currents within the voice frequency band. The figure also shows control devices A1 to A7 which are characteristic to the invention. These control devices will be described more in particular below. The devices A1 and A2 which are connected in series with the line conductors, can be designed for adjustment of the line current and also for amplification of the speech currents. The devices A3 and A4 are designed to amplify the speech current and preferably consist of so called negative resistances. The devices A5 and A6 are preferably designed to control the intensity of the line current in desired manner. The device A7 finally preferably consists of a so called negative resistance for parallel connection. Such negative resistances are well known, see e.g. Monograph 2294, Bell Telephone System Technical Publication "Transistor Negative Impedance Converters" by J. G. Linwill and Proceedings of the IRE, July 1955, pages 793–796, "Some Gyrotor and Impedance Inverter Circuits" by B. P. Bogert.

Figure 5:
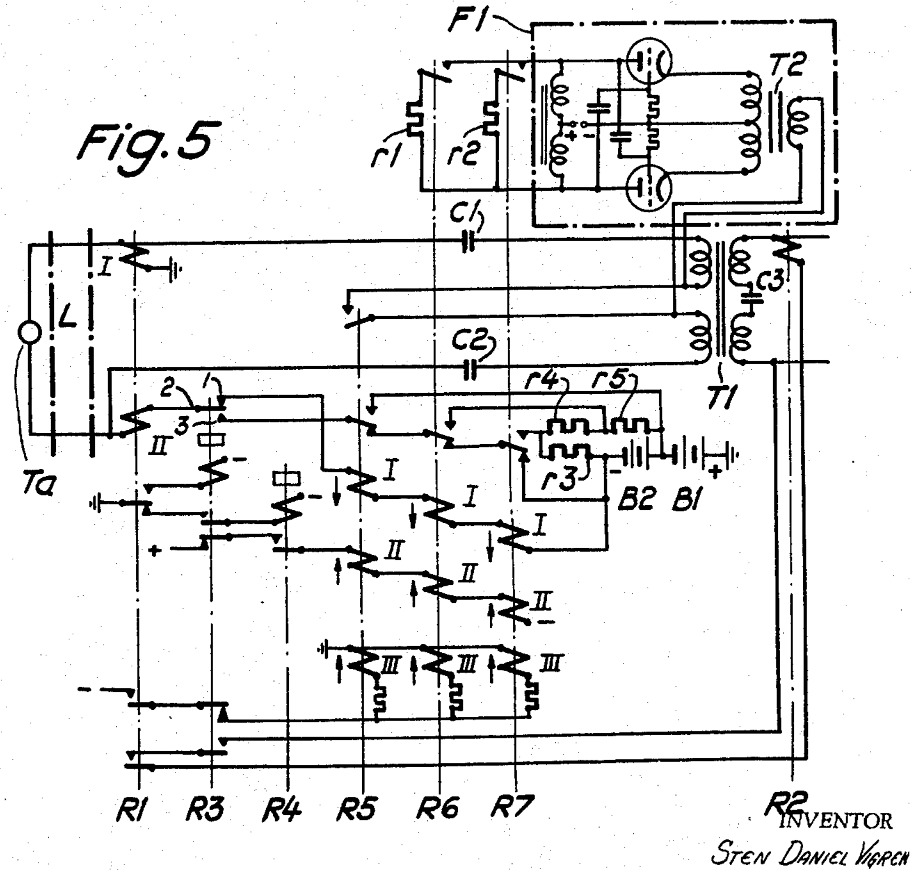
Figure 5 shows an embodiment having relays for the control of the line current. In accordance with a feature of the invention this embodiment comprises means for automatic gain control acting in response to the required current control action.

In Figure 5 an embodiment of the invention is shown more in detail. In this embodiment relays are used for the adjustment of the line current. The relays R1, R2, R3 and R4 are included in the relay repeater previously mentioned. The remanence relays R5, R6 and R7 form part of the control device according to the invention for adjusting the line current to the desired value. In addition to the ordinary battery B1 there is provided an additional voltage source B2 bridged by a voltage divider consisting of resistors *r*3, *r*4 and *r*5. From this voltage divider different voltages can be applied to the line over relay contacts. The capacitors C1, C2 and C3 and the induction coil T1 are included in known manner in the equipment of the link circuit. The figure also shows an amplifier F1 which is in the form of a negative resistance. The magnitude of this resistance can be adjusted by means of relays R6 and R7.

The arrangement according to Figure 5 operates in the following manner. When the handset is lifted from the subscriber's apparatus T*a*, the windings I and II of relay R1 receive current over the following circuit: The negative pole of battery B2—windings I of relays R7, R6 and R5—contacts 1 and 2 of relay R3—winding II or relay R1—one branch of line L—subscriber's apparatus T*a*—the other branch of line L—winding I of relay R1—earth. Relay R1 is operated by this current and then closes an energizing circuit for relay R3. The last mentioned relay is designed for delayed action (which is indicated on the figure by a rectangle above the relay coil). After relay R3 has received energizing current a certain time will thus pass before this relay operates its contacts. During this delay time current still flows through windings I of relays R7, R6 and R5, and at the same time current flows through windings III of these relays via a break contact on relay R3 and a make contact on relay R1. The intensity of the current through windings I of relays R5, R6 and R7 obviously becomes dependent on the resistance of the line L, while the intensity of the current through windings III is determined by the resistors connected in series with these windings. Relays R5, R6 and R7 are remanence relays and they are all assumed to be in operated condition before the said circuit through the subscriber's apparatus T*a* is closed. The contacts of these relays then have the positions shown in the figure. The windings I and III of each of relays R5, R6 and R7 are so arranged, that the flux produced by current through one winding counteracts the flux produced by current through the other winding, and when current flows through both windings, the relay will remain in operated condition or be released depending on whether the flux of one or the other winding dominates. The windings III and the resistors connected in series therewith are so dimensioned, that the flux produced by these windings is different for each of relays R5, R6 and R7. Therefore, when a current the intensity of which depends on the resistance of line L, flows through windings I of all the relays R5, R6 and R7, none or one or more of these relays will be released, depending on the intensity of the current through windings I. In the embodiment shown in Figure 5 it is assumed that relay R5 is released at a very small line resistance, relay R6 at a moderate line resistance and relay R7 at a relatively high line resistance, while none of the said relays is released if the line resistance is very high. When relay R3 operates its contacts after the said delay time, line L will be connected to some of the taps on the voltage divider *r*3—*r*4—*r*5 via contacts 2 and 3 on relay R3 and one or more of the change-over contacts on relays R5, R6 and R7. At the same time the current through windings I and III of relays R5, R6 and R7 is interrupted, and those of these relays which have been released, will remain in released condition as long as the speech connection lasts.

Thus line L is fed with a voltage whose magnitude corresponds with the magnitude of the resistance of the line. Preferably the voltage is so chosen that the current through line L becomes substantially the same for different line resistances or so that the line current becomes somewhat larger when the line resistance is large. In the last-mentioned case the microphone current at the subscriber's apparatus will be somewhat larger when the line resistance is large than when the line resistance is small. By this means the residual attenuation which is present due to the stability conditions of the amplifier F1, can be compensated for as regards the transmission from the subscriber's apparatus.

The gain of the amplifier (negative resistance) F1 can also be adjusted by means of relays R5, R6 and R7 to a desired value depending on the resistance of line L. If the resistance of the line is very high, all relays R5, R6 and R7 remain in operated condition, and then the amplifier yields maximum gain. If the line resistance is somewhat less but still comparatively high, relay R7 is released and connects the resistor $r2$ in parallel with the amplifier F1, whereby the gain is reduced. If relay R6 is also released, which happens in the case of a moderate line resistance, the resistor $r1$ is also connected in parallel with the amplifier whereby the gain is still further reduced. If finally relay R5 is also released, which happens in the case of a low line resistance, the primary winding of transformer T1 in amplifier F1 is short-circuited by a break contact on relay R5 whereby the amplifier becomes wholly ineffective.

It will be seen from the above that the speech attenuation from the microphone as well as the normal speel attenuation can be eliminated by means of the device shown in Figure 5.

When the subscriber at T$a$ restores his handset at the end of the conversation, the current through line L is interrupted, and then relays R1 and R3 are released. However, the release of relay R3 is delayed, and during the delay time relay R4 receives energizing current via contacts on relays R1 and R3 and is operated. Hereby an energizing circuit for windings II of relays R5, R6 and R7 is closed, so that these relays are restored to operated condition (if they are not already in operated condition). After the cessation of the current through windings II the relays remain in operated condition due to remanence.

It will be seen that the relay chain R5—R6—R7 constitutes a memory which receives information on the resistance of the subscriber's line as soon as the line is seized and stores this information. Means controlling the voltage applied to the line and the gain of the amplifier are set by the memory in accordance with the received information, and the settings of these means are maintained by the memory until the line is disconnected.

The said relay chain can of course comprise a larger number of relays than is the case in the embodiment shown on the figure. The number of relays in this relay chain is determined by the desired accuracy of the control of the line voltage and of the gain of the amplifier.

Figure 6:
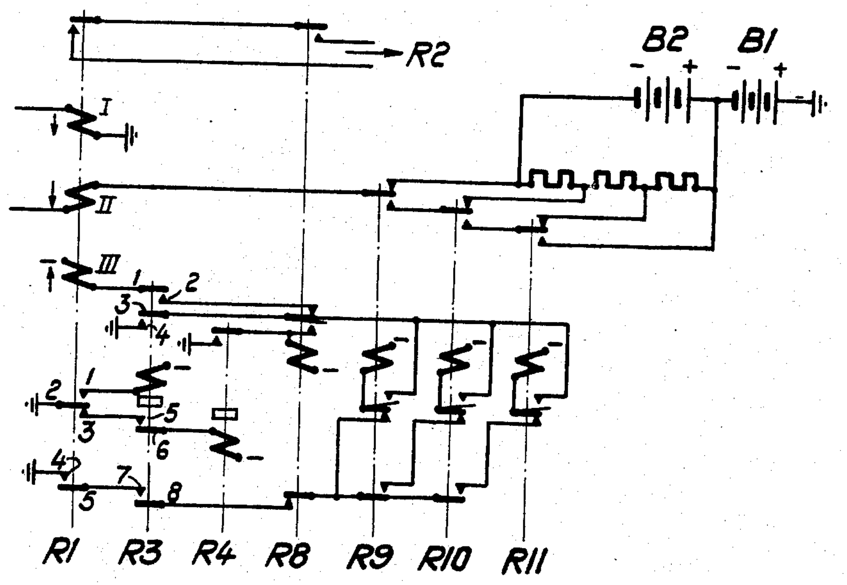
Figure 6 shows another embodiment having relays for the control of the line current.

In the embodiment shown in Figure 6 the control device also comprises a relay chain R8–R11 which serves as a memory device.

The arrangement according to Figure 6 works in the following manner. When the handset at the subscriber's apparatus is lifted, relay R1 is operated whereupon relay R3 also operates. The relays of the relay chain R9–R11 are so arranged that a make contact on each relay is included in an energizing circuit for the next relay in the chain. When relays R1 and R3 have operated, relays R9, R10 and R11 will therefore be operated in turn in response to current via contacts 4 and 5 on relay R1 and contacts 7 and 8 on relay R3. Relays R9–R11 connect by their change-over contacts a successively increasing voltage to the line circuit, and thus the line current is successively increased until the current through windings I and II balances the current through winding III so that relay R1 is released. Then contact 4—5 on relay R1 is broken so that the energizing circuit for relays R9–R11 is interrupted. Those of said relays which have already operated, receive holding current via the make portions of the make-before-break contacts on these relays. In other words the control device will adjust the line current to such a value that the ampere turns of windings I and II becomes substantially equal to the ampere turns of winding III whereby a predetermined preferably constant line current is obtained. When relay R1 is released, relay R4 is operated, and then relay R8 is also operated and interrupts the current through winding III of relay R1, so that this relay is operated again. Relay R8 also interrupts the energizing circuit for relays R9–R11 so that the above-mentioned pattern of operated and non-operated conditions of these relays is retained until the end of the conversation. The extension of the connection to the next switching member e.g. energization of relay R2, is delayed by a make contact on relay R8.

Any desired accuracy of the adjustment of the line current can be obtained if a sufficient number of relays is provided in the relay chain R9–R11. The device can also be so designed that an increased resistance of the line circuit causes an increased intensity of the current through the circuit. An improvement of the adjustment accuracy can also be obtained if a polarized relay is substituted for relay R1.

In the embodiments shown in Figures 5 and 6 relay R1 serves both as impulse relay and control relay for the device according to the invention. Of course a separate relay, and preferably a polarized relay, can be used for the control in which case this relay is disconnected from the line circuit after the control operation whereupon an ordinary current feed and impulse relay is connected to the circuit.

The relays R9–R11 in Figure 6 can of course also be provided with means for adjustment of the gain of an amplifier for amplifying the speech current in a manner analogous to that described in conjunction with Figure 5.

Figure 7:
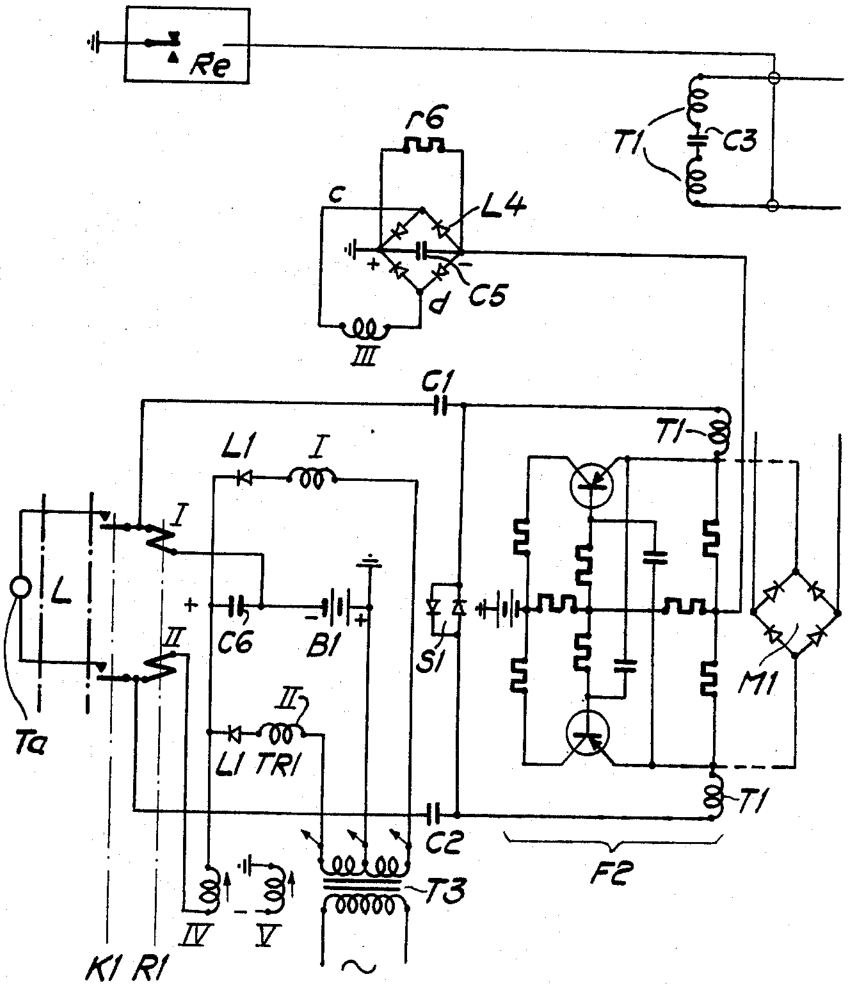
Figure 7 shows another embodiment having a saturable core reactor for controlling the line current and also having means for automatic gain control in response to the current control.

In the arrangement according to Figure 7 the line current and the gain of the amplifier is regulated by means of a saturable core reactor TR1. This reactor comprises the alternating current windings I, II and III and the direct current windings IV and V. The saturable core reactor is fed from a common transformer T3. The alternating current is rectified by means of rectifiers L1. Each of the windings I and II are preferably divided in two parts located on separate elements of the reactor in order that the self magnetization shall not become too large. The amplifier F2 (negative resistance) is provided with transistors arranged in known manner. The capacitors C1-C3, the induction coil T1, relay R1 and the remaining part of the link circuit L$e$ are arranged in the ordinary way.

The winding III of the saturable core reactor delivers a control voltage which is rectified by rectifier L4, is smoothed by the capacitor C5 and is applied to the amplifier F2 in a manner to be described below. The non-linear resistors M1 arranged in a bridge circuit constitute another means for the gain control as will also be described below. In order to protect the transistor against too high voltages a voltage limiting device S1 is provided, which may consist of e.g. rectifier elements connected as shown in the figure. The rectified voltage delivered from the saturable core reactor to the line is smoothed by means of capacitor C6. This voltage is applied in series with the voltage from the ordinary D.C. power source B1 of the automatic exchange.

The arrangement works in the following manner. Upon a call from the subscriber's apparatus T$a$ the apparatus is connected to the link circuit in known manner by a contact device K1. The current through the line circuit then flows through an impulse and current feed relay R1 and the direct current winding IV of the saturable core reactor. Under the assumption that this winding has a relatively small number of ampere turns the current in the line circuit is substantially determined by the number of ampere turns of winding V. In accordance with known characteristics of the saturable core reactor the latter strives to keep the number of ampere turns of the alternating current windings substantially equal to that of the direct current windings. Therefore the line current will be adjusted to a substantially constant value independent of the resistance of the line, because the current through winding V is constant. However, due to the imperfection of the saturable core reactor a complete compensation of the variations of the line resistance cannot be obtained in this manner. Therefore part of the line current is passed through winding IV of the saturable core reactor which winding coacts with winding V whereby a current is obtained which is practically constant at different line resistances. If it is desired that the efficiency of the microphone of the subscriber's apparatus should be increased in the case of long lines, the number of ampere turns of winding IV can be so chosen that a slight increase of the line current is obtained if the resistance of the circuit is high.

The direct current windings IV and V can also be so arranged that they counteract each other. In such case they should be dimensioned to have substantially equal numbers of ampere turns when the line resistance is minimum, so that the number of ampere turns is reduced in winding IV when the line resistance is increased whereby a resulting number of direct current ampere turns is obtained for regulation. Alternatively the winding IV can be connected in parallel with the capacitor C6 instead of in series with the line circuit. By this means an increased direct current magnetization is obtained when the line resistance increases in which case a constant or increasing line current is obtained with increasing line resistance. Thus if the current in the line circuit is 28 ma. at a line resistance of 0 ohm, a line current of 32 ma. can be obtained at a line resistance of 2000 ohms.

Thus if the line resistance is high, the voltage drop across the alternating current winding of the saturable core reactor will be less than when the line resistance is small. The voltage delivered by winding III will also be less when the line resistance is high than when it is low, and therefore the rectified control voltages to the emitter and/or collector of the transistor will be reduced and the gain will be increased in the case of long lines. Of course the control voltage must be adapted to the characteristics of the transistors so that an appropriate gain regulation is achieved. It may then be necessary to apply a constant bias to the electrodes and to apply a control voltage in known manner in such sense with respect to the constant bias that regulation of the gain occurs only at a certain line resistance, i.e. at a certain voltage from winding III. In this manner the gain control can be made to set in more or less rapidly. It may also prove convenient to control simultaneously the voltage on a plurality of electrodes of the transistors. In this case the saturable core reactor can be provided with additional windings each delivering a control voltage which is supplied to the respective electrode. Alternatively the load circuit of the amplifier can be loaded with a varying load to yield a varying gain. For this purpose nonlinear resistors M1, e.g. silicon carbide resistors, in a bridge circuit are preferably connected to the amplifier as shown in Figure 7. One diagonal of the bridge circuit is connected to the load circuit (indicated by dotted lines in Figure 7) of the amplifier and the other diagonal is connected to a rectifier fed by a suitably dimensioned alternating current winding on the saturable core reactor.

In all the shown embodiments the control of the gain and of the line current can be performed in response to the voltage existing between the line conductors of the used subscribers' lines, since this voltage represents a measure of the resistance of the line. From the above description it will be seen that the control devices according to Figures 5 and 6 test the line resistance at the moment the line is seized and immediately thereafter adjust the line current and the gain in accordance with said test. The arrangement according to Figure 7 on the other hand adjusts the line current as it varies during the duration of the conversation. During the conversation it does not matter much which of these systems is used. Possibly an increase of the line current at increased line resistance can be obtained more easily by the first-mentioned system than by the last mentioned one. During the impulse transmission on the other hand, i.e. when the line is momentarily interrupted, the largest voltage variations in the line occur in the system according to Figure 7.

In the case that the control device is set at the moment when the link circuit is seized, a connection can of course be made momentarily to a part of a control device which is common to a plurality of link circuits and which, depending on the line resistance, performs a connection of such a potential to the line that the desired current is then obtained. Thus the relays R5–R7 according to Figure 5 and relays R9–R11 according to Figure 6 can be placed in such a common device and be so arranged that after they have been set they operate relays in the respective link circuit, the last-mentioned relays being arranged in a suitable combination, e.g. a so called pyramid circuit. Hereby a smaller number of relays can maintain the set condition than if a complete chains of relays are provided for each link circuit.

In the case that the negative resistance for amplification of the speech current is not symmetrical with respect to earth, this resistance can be inserted between two transformers forming a circuit which is unsymmetrical with respect to earth. Alternatively the negative resistance can be connected to a separate winding on the induction coil. In the last-mentioned case the resistance is preferably designed as a shunt repeater.

It has been described above how the properties of the saturable core reactor of maintaining the number of alternating current ampere turns equal to the number of direct current ampere turns is utilized for the desired current control. The transistor possesses a similar property. The collector current of a junction transistor tends to maintain the same intensity as the emitter current. This property is utilized in an embodiment of the present invention in such manner that the line circuit is connected in series with the base-collector circuit and the voltage source, one pole (the positive pole in the case of p-n-p transistors) of which is connected to the base. A pole of opposite polarity of a voltage source having a higher voltage than the aforementioned voltage source is connected over a resistor to the emitter so that a substantially constant emitter current is obtained. This circuit is usually called common base connection. If a resistor of a suitable value is connected in series with the base before its connection to the voltage source, a negative impedance is obtained in known manner. Hereby an increased line current is obtained at increased line resistance.

Figure 8:
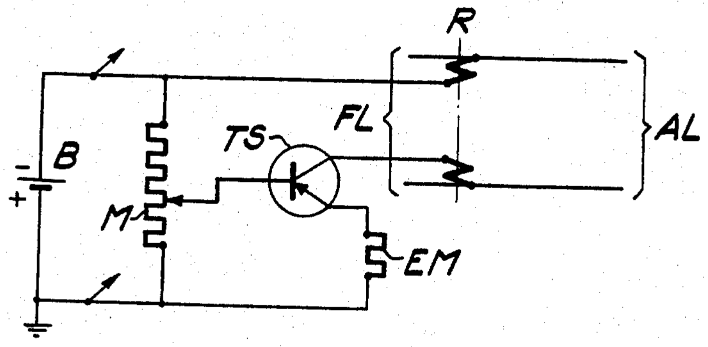
Figure 8 shows an arrangement in which the current control is effected by means of a transistor connected to supply a constant current to a load which in this case consists of the subscriber's line connected to the current feed device.

A similar effect can also be obtained in the circuit called common emitter connection. In this case also the collector is connected in series with the line circuit. The advantage of this circuit lies in the fact that the base current is small as compared with the collector current, and therefore the current consumption will be smaller than in the case of common base connection. The circuit shown in Figure 8 comprises a transistor TS serving as a control member for maintaining the line current constant. In this circuit the collector of the transistor is connected to one line conductor and its emitter is connected to the positive pole of the battery B. The negative pole of the battery is connected to the other line conductor. The base of the transistor is connected to a movable contact on a potentiometer M the terminals of which are connected across the battery B. The emitter circuit of the transistor also includes an emitter resistor EM. The desired intensity of the current in the line circuit can be adjusted by means of the potentiometer M.

When a transistor is used to maintain the line current constant at varying line resistance, the voltage drop across the transistor (the whole voltage minus the voltage across the line loop) is preferably applied to the speech current amplifier as a gain control voltage. The voltage derived from across the transistor becomes larger the less the line resistance is. If therefore this voltage is applied to the amplifier in some known manner so that the gain is reduced when the voltage increases, an increase of the gain will be obtained at an increase of the line resistance as is one purpose of the present invention.

What I claim is:

1. In a telecommunication system, an exchange having switching means, lines terminating in said exchange, current supply means selectively connectable to said lines by said switching means for supplying direct current to said lines, said current supply means comprising rectifiers, alternating current circuits for supplying alternating current power to the input of said rectifiers, current control means associated with said current supply means to maintain the direct current supplied to the lines substantially constant, said current control means including a saturable core reactor having alternating current windings connected in series with said alternating current circuits, and means for supplying direct current to said saturable core reactor.

2. In a telecommunication system, an exchange comprising switching means and link circuits, lines terminating in the exchange and selectively connectable to said link circuits by said switching means, a direct current source common to said link circuits, separate direct current sources for the separate link circuits, means connecting said separate direct current sources in series with said common direct current source, current control means individually associated with said separate direct current sources to maintain the current delivered from the respective separate current source in series with said common direct current source to a line connected to the respective link circuit at a substantially constant value independent of the resistance of the line.

3. In a telecommunication system, an exchange having switching means, lines terminating in said exchange, current supply means selectively connectable to said lines by said switching means for supplying direct current to the lines, repeaters for signals transmitted over said lines, gain control means for said repeaters, current control means automatically adjustable in accordance with the resistance of a line connected to the current supply means to control the current supplied to the line, means connecting said gain control means to be operable by said current control means to maintain the gain of the repeater at a predetermined level.

4. In a telecommunication system, an exchange having switching means, line conductors terminating in said exchange, current supply means selectively connectable by said switching means to the line conductors for supplying direct current to the lines, repeaters for amplifying signals transmitted over said lines, gain control means for said repeaters, current control means associated with said current supply means for controlling the current supplied to the lines, and means responsive to the direct voltage existing between the line conductors at the exchange for controlling said gain control means to maintain the gain of the repeater at a predetermined level.

5. In a telecommunication system: an exchange having switching means; lines terminating in said exchange; current supply means selectively connectable by said switching means to said lines for supplying direct current to the lines; at least one transistor having base, emitter and collector electrodes; a collector circuit for said transistor; means for connecting the power supply means and the line in series with said collector circuit; and an emitter circuit for said transistor including means for producing a substantially constant emitter current.

References Cited in the file of this patent

UNITED STATES PATENTS

| | | |
|---|---|---|
| 1,641,233 | Powell | Sept. 6, 1927 |
| 2,167,069 | Halligan | July 25, 1939 |
| 2,247,254 | Schwenn | June 24, 1941 |
| 2,251,302 | Stehlik | Aug. 5, 1941 |